(12) United States Patent
Friday

(10) Patent No.: US 12,134,743 B2
(45) Date of Patent: Nov. 5, 2024

(54) TREATMENT SYSTEM

(71) Applicant: CF Vessel LLC, Fredericksburg, TX (US)

(72) Inventor: Colby Friday, Fredericksburg, TX (US)

(73) Assignee: CF Vessel LLC, Fredericksburg, TX (US)

(*) Notice: Subject to any disclaimer, the term of this patent is extended or adjusted under 35 U.S.C. 154(b) by 0 days.

(21) Appl. No.: 18/384,087

(22) Filed: Oct. 26, 2023

(65) Prior Publication Data

US 2024/0141245 A1 May 2, 2024

Related U.S. Application Data

(60) Provisional application No. 63/419,464, filed on Oct. 26, 2022, provisional application No. 63/419,500, filed on Oct. 26, 2022, provisional application No. 63/419,443, filed on Oct. 26, 2022, provisional application No. 63/419,539, filed on Oct. 26, 2022.

(51) Int. Cl.
| | |
|---|---|
| *C10L 3/10* | (2006.01) |
| *B01D 53/52* | (2006.01) |
| *B01D 53/78* | (2006.01) |
| *B01D 53/79* | (2006.01) |

(52) U.S. Cl.
CPC ............ *C10L 3/104* (2013.01); *B01D 53/526* (2013.01); *B01D 53/78* (2013.01); *B01D 53/79* (2013.01); *C10L 3/103* (2013.01); *B01D 2251/604* (2013.01); *B01D 2251/70* (2013.01); *B01D 2256/245* (2013.01); *B01D 2257/304* (2013.01); *B01D 2257/504* (2013.01); *B01D 2259/124* (2013.01); *C10L 2290/14* (2013.01); *C10L 2290/544* (2013.01); *C10L 2290/545* (2013.01); *C10L 2290/56* (2013.01)

(58) Field of Classification Search
CPC ............ B01F 25/43141; B01F 25/433; B01F 25/4331; B01F 7/325; B29B 7/325
USPC .................................. 138/155; 366/336–339
See application file for complete search history.

(56) References Cited

U.S. PATENT DOCUMENTS

| | | | | |
|---|---|---|---|---|
| 3,704,006 A | * | 11/1972 | Grout ................... | B01F 25/4331 366/339 |
| 3,888,465 A | * | 6/1975 | Terwilliger ............ | G03C 1/015 366/339 |

(Continued)

FOREIGN PATENT DOCUMENTS

| | | | | |
|---|---|---|---|---|
| WO | WO-9811395 A1 | * | 3/1998 | ............... B01D 1/04 |

*Primary Examiner* — Patrick F Brinson
(74) *Attorney, Agent, or Firm* — Kaplan Breyer Schwarz, LLP

(57) ABSTRACT

A treatment system for remediating some forms of sulfur, $CO_2$, and other contaminants/impurities from a gas stream includes at least one of a process vessel and a treatment coil. Each of the vessel and treatment coil have internals, different in design from each other, which promote intimate mixing and extended contact time between a treatment composition and a gas being treated. The vessel, which additionally facilitates vapor/liquid separation, operates about one-half to two-thirds full of liquid treatment composition. In some embodiments, the treatment coil is a serpentine arrangement of piping, into which the atomized treatment composition is injected on a continuous basis.

20 Claims, 4 Drawing Sheets

(56) References Cited

U.S. PATENT DOCUMENTS

| | | | | |
|---|---|---|---|---|
| 4,641,705 | A * | 2/1987 | Gorman | F28F 13/125 |
| | | | | 165/174 |
| 5,909,959 | A * | 6/1999 | Gerich | B01F 25/433 |
| | | | | 222/459 |
| 6,119,769 | A * | 9/2000 | Yu | F28F 1/405 |
| | | | | 165/184 |
| 7,045,060 | B1 * | 5/2006 | Liles | B01F 25/433 |
| | | | | 210/199 |
| 7,484,881 | B2 * | 2/2009 | Schulz-Hanke | |
| | | | | B01F 25/43141 |
| | | | | 422/275 |
| 8,967,849 | B2 * | 3/2015 | VanDalsem | A23L 5/13 |
| | | | | 366/85 |
| 10,913,911 | B1 | 2/2021 | Roe | |
| 11,549,064 | B2 | 1/2023 | Roe et al. | |
| 2004/0124136 | A1 * | 7/2004 | Bak | B01J 19/006 |
| | | | | 210/512.1 |
| 2010/0006478 | A1 * | 1/2010 | Spicer | C10G 9/206 |
| | | | | 422/236 |
| 2010/0126213 | A1 * | 5/2010 | Peng | B01D 1/305 |
| | | | | 62/503 |
| 2011/0188341 | A1 * | 8/2011 | Wiechers | B01D 15/16 |
| | | | | 366/339 |

* cited by examiner

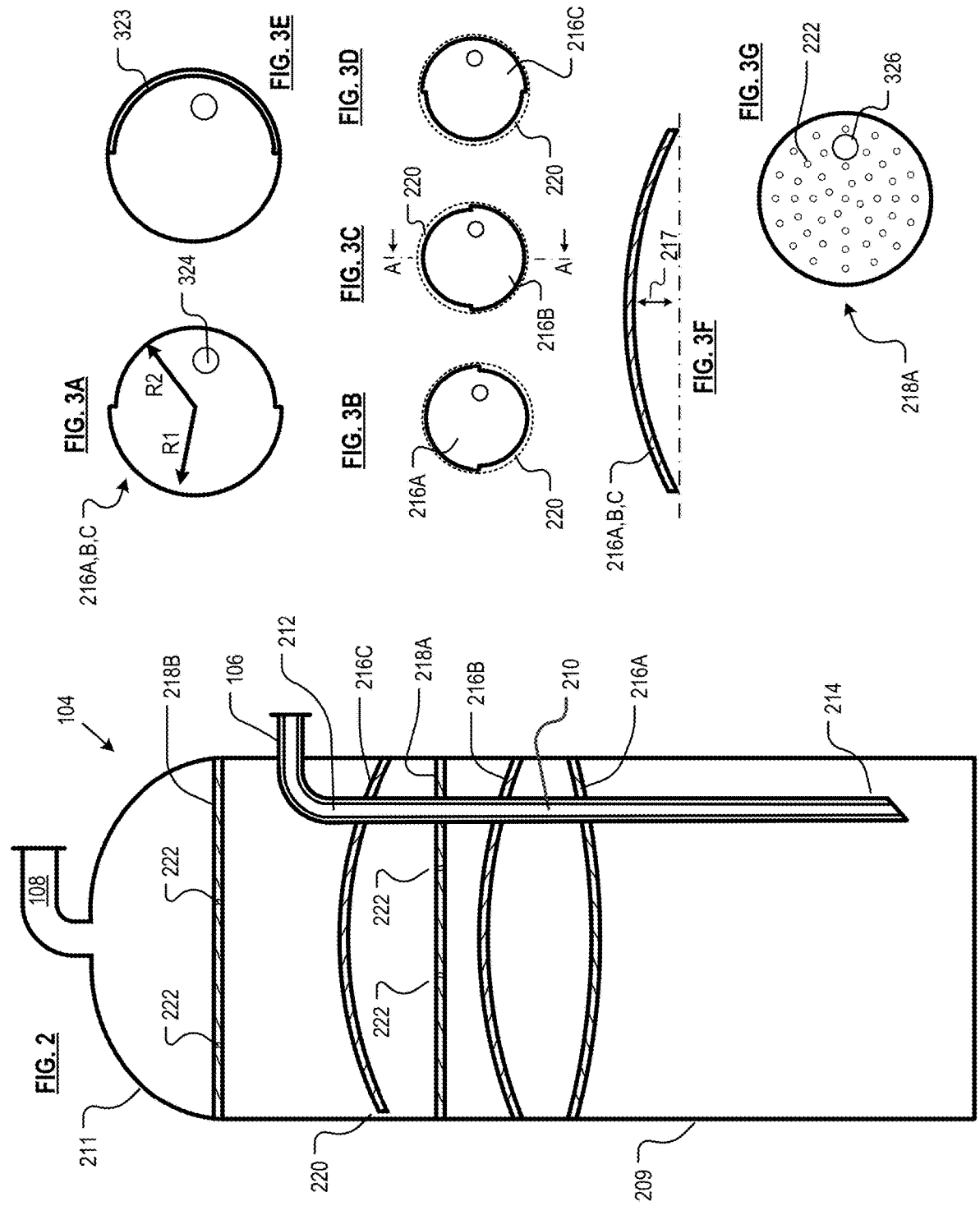

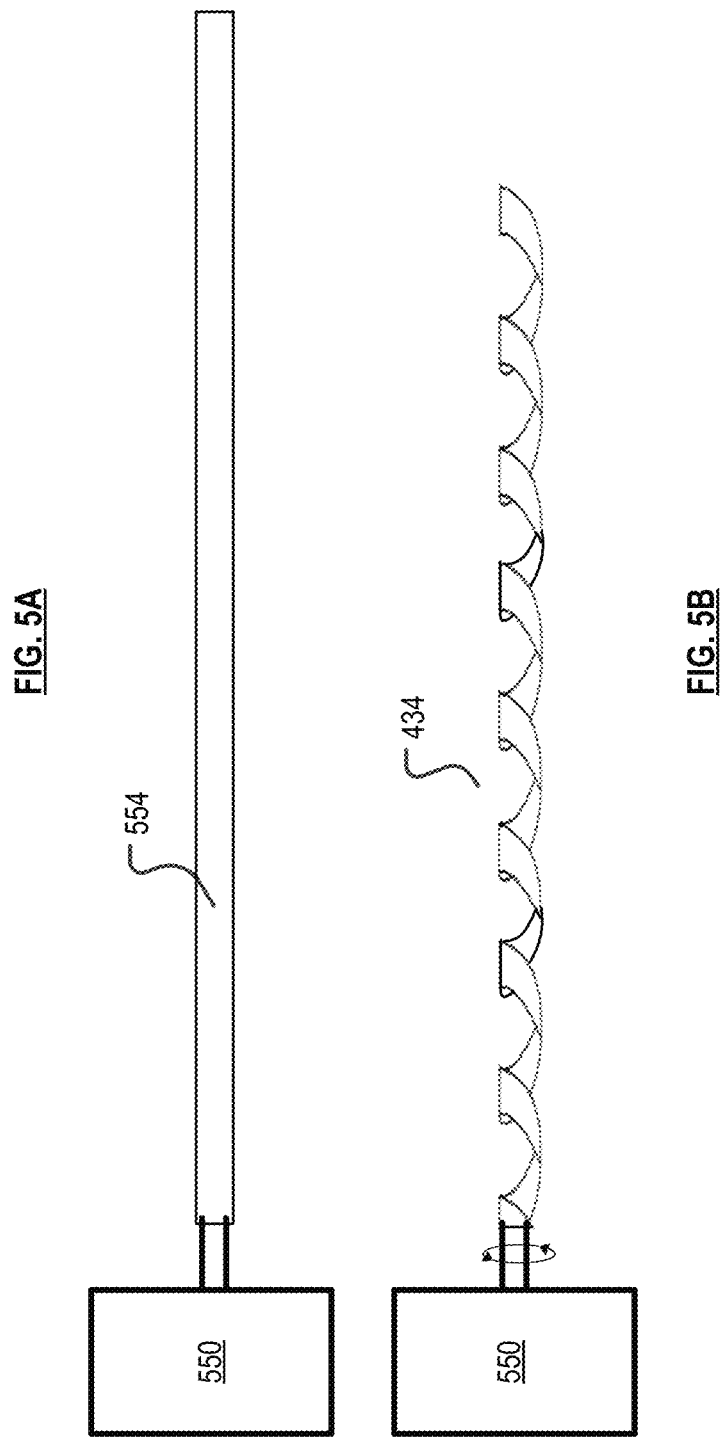

TREATMENT SYSTEM

STATEMENT OF RELATED CASES

This specification claims priority of U.S. Patent Applications 63/419,443, 63/419,464, 63/419,500, and 63/419,539, each of which was filed on Oct. 26, 2022, and each of which is incorporated by reference herein.

FIELD OF THE INVENTION

The present invention relates to equipment and methods for removing impurities from gaseous streams.

Background

Any of a variety of impurities/contaminants are present in naturally occurring (Earth-sourced) gas sources, such as oil/gas reservoirs. And many impurities can be generated as byproducts in various industrial processes and equipment (e.g., pharmaceutical, oil and gas processing, power plants, generators, etc.). Such impurities may be a direct or indirect health hazard (e.g., humans, environment, etc.), may have deleterious effects on process equipment (e.g., fouling, corrosion, etc.), and/or may cause a final product to be out of specification and unsaleable, among any other problems. Some impurities may be readily treated, while others may require costly treatment (in terms of the treatment chemistry and/or the process equipment required). And in many cases, the treatment system for one type of impurity may be inapplicable for treating another type of impurity. As such, systems for treating impurities can be a significant cost factor in the overall cost of producing any number of products.

An example of one such impurity is hydrogen sulfide ($H_2S$), which is a colorless, flammable, and extremely hazardous gas, immediately recognizable by it's characteristic "rotten-egg" smell. The burning of hydrogen sulfide (or elemental sulfur) forms sulfur dioxide and related compounds (i.e., $SO_x$). Sulfur dioxide is considered to be harmful to the atmosphere, and the discharge of even small quantities thereof requires permits from the EPA and other regulatory bodies.

The presence of sulfur compounds, particularly hydrogen sulfide, in natural gas and crude oil presents a significant operational challenge for the oil and gas industry. From the moment it enters the wellbore until the time it is processed or burned along with natural gas, sulfur presents safety, corrosion, and environmental issues. In fact, natural gas and/or crude cannot be produced from some wells due to sulfur levels in the reservoir fluids. This has led to stranded oil and gas reserves, and deep discounts for crude oil, natural gas, and other refined products that contain sulfur compounds.

Various technologies are used to remove sulfur from oil and gas. For example, triazines are used to sweeten sour gas (i.e., remove sulfur from natural gas) when the hydrogen sulfide concentration is below a few hundred ppm. However, triazine treatment is expensive and presents certain problems, such as downstream fouling.

U.S. Pat. Nos. 10,913,911 and 11,549,064, which are incorporated by reference herein, disclose treatment compositions and systems for remediating $H_2S$, $CO_2$, and other contaminants from gas streams. The treatment composition is very effective at removing $H_2S$, $CO_2$, and other contaminants. The system disclosed in the '911 patent includes, optionally, a three-phase separator for providing a gas-phase (e.g., natural gas, etc.) stream for processing. The gas-phase stream is then passed to a water-wash unit for removing contaminants such as Na and Cl ions, a chiller and a coalescing or dehydrating unit to reduce water content to very low levels, a counter-flow reactor with injectors for injecting a treatment composition for contaminants removal, and a dehydrator. According to the '064 patent, the performance of the system disclosed in the '911 can be improved by, in addition to any other modifications, compressing the contaminated gas after it passes through the water-wash unit.

Although the systems disclosed in the '911 and '064 patents offer benefits over pre-existing systems for remediating $H_2S$, $CO_2$, and other contaminants from gas streams, those systems are still relatively complicated.

SUMMARY

Embodiments of the invention provide a relatively uncomplicated treatment system for removing impurities from gaseous streams. The equipment can be used with a variety of different treatment compositions, so as to treat a variety of different types of impurities. In the illustrative embodiment, the equipment design is used in conjunction with a treatment composition to effectively remove sulfur compounds, such as hydrogen sulfide and mercaptans, as well as carbon dioxide, from a natural gas stream.

In some embodiments, the treatment system includes a process vessel having internals that promote intimate mixing and extended contact time between a treatment composition and a gas being treated, as well as facilitating vapor/liquid separation. The vessel operates about one-half to two-thirds full of the (liquid) treatment composition. In some additional embodiments, the treatment system includes more than one of such process vessels arranged in series or parallel.

In some other embodiments, a treatment system includes a treatment coil, which in some embodiments comprises a serpentine arrangement of piping. The treatment coil includes internals that promote intimate mixing of a treatment composition and a gas being treated. The internals of the treatment coil, which in some embodiments have a helical form, do not create an obstruction to the flow of gas. In some additional embodiments, the treatment system includes more than one of such treatment coils arranged in series or parallel. In some further embodiments, the piping of the treatment coil is not arranged in serpentine fashion. In some embodiments, the treatment coil is oriented horizontally, in some other embodiments, the treatment coil is oriented vertically, and in some other embodiments, the treatment coil is oriented at angle between horizontal and vertical.

In some yet further embodiments, a treatment system comprises both the treatment coil and the vessel, with the treatment coil being located upstream of the vessel. This embodiment can address gas streams containing relatively high impurity levels and/or provide a redundancy in case issues arise in the treatment coil or the vessel, among other utility. In some further embodiments in which the treatment system includes both types of equipment, more than one version of the treatment coil and/or more than one version of the vessel are included.

In still some additional embodiments, a design of internals for use in conjunction with a treatment vessel is provided.

In some specific embodiments, the invention provides a system comprising a treatment coil, the treatment coil including a serpentine arrangement of pipe, wherein the serpentine arrangement comprises:

a number, n, of straight segments of pipe, a number, n−1, of u-bends, wherein the n−1 u-bends couple the n straight segments of pipe together to create the serpentine arrangement, and one or more instances of an internal that has a helical form, wherein respective ones of the internal are disposed in at least one of the straight segments of pipe.

In some other specific embodiments, the invention provides a system comprising a first treatment coil, the first treatment coil comprising a serpentine arrangement of pipe having a first length, wherein the serpentine arrangement of pipe comprises a first plurality of straight segments of pipe and a second plurality of u-bends, wherein the u-bends couple the straight segments of pipe together to create the serpentine arrangement; and one or more instances of an internal, wherein respective ones of the internal are disposed in some of the straight segments of pipe, wherein each of the one or more instances of the internal has a helical form.

In some as yet additional specific embodiments, the invention provides a system comprising a treatment coil, the first treatment coil comprising a plurality of pipes that are fluidically coupled together, the pipes being arranged in either a linear form or a non-linear form; and one or more instances of an internal disposed in at least some of the pipes of the plurality thereof, wherein each of the one or more instances of the internal has a helical form.

In some further specific embodiments, the invention provides a method for treating a gas containing at least one impurity, the method comprising:

delivering the gas to a first end of a serpentine arrangement of pipe, the serpentine arrangement comprising one or more instances of an internal having a helical form; and injecting, on a continuous basis, a treatment composition for treating the at least one impurity, wherein the treatment composition is introduced proximate to, and downstream of, a location at which the gas is delivered.

BRIEF DESCRIPTION OF THE DRAWINGS

FIG. 2 depicts a process vessel of the treatment system of FIG. 1.

FIGS. 3A through 3F depict the structure of a baffle of the process vessel of FIG. 2.

FIG. 3G depicts a knock-out plate of the process vessel of FIG. 2.

FIGS. 5A and 5B depict the fabrication of an internal for use in the treatment coil of FIG. 4.

DETAILED DESCRIPTION

Figure 1:
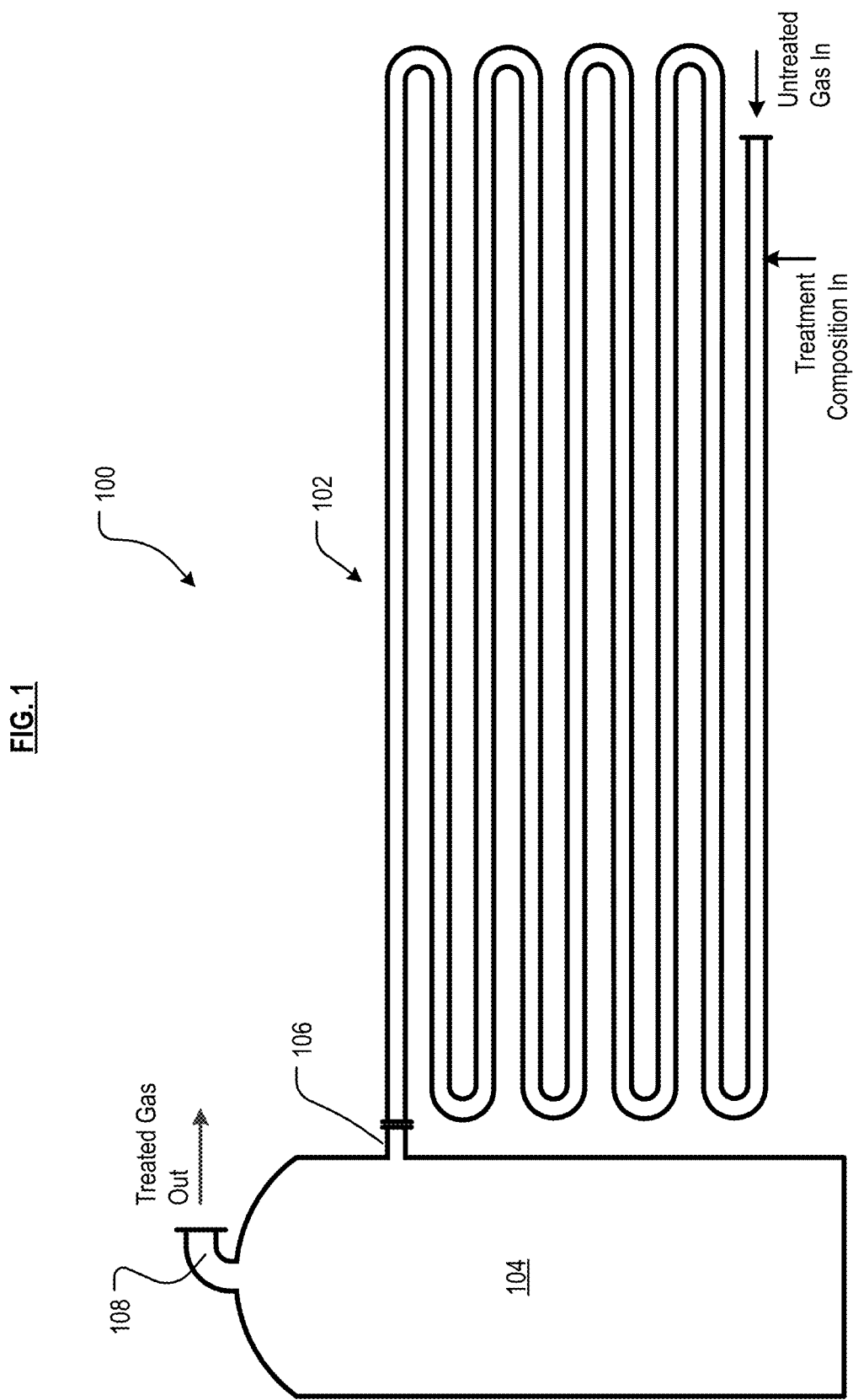
FIG. 1 depicts a treatment system in accordance an illustrative embodiment of the invention.

FIG. 1 depicts treatment system 100. The system, when used with an appropriate treatment composition, is effective at removing any of number of different types of contaminants from gaseous hydrocarbon streams, such as natural gas, as well as from streams containing chemical species other than hydrocarbons. Treatment system 100 is useful in conjunction with any treatment composition that requires simple (but effective/intimate) contact with impurities it is intended to treat. Two types of contaminants of particular importance in natural gas include sulfur compounds (e.g., hydrogen sulfide, mercaptan sulfur, etc.) and carbon dioxide.

In the embodiment depicted in FIG. 1, system 100 includes treatment coil 102 and vessel 104, which are fluidically coupled as shown. Untreated gas is introduced to system 100 at the inlet of treatment coil 102. In some embodiments, vessel 104 operates partially full (typically about 50 to 75 percent full) of a treatment composition. Additionally, treatment composition is continuously injected into system 100 near the inlet of treatment coil 102. For injection into treatment coil 102, in some embodiments, a (liquid) treatment composition is atomized.

Both treatment coil 102 and vessel 104 include internals, described later in this specification. In treatment coil 102, the internals promote intimate mixing of the treatment composition and the gaseous impurity-bearing stream. Additionally, the internals of the treatment coil are designed to maintain a strong flow of the gaseous stream. That is, the internals should not create an obstruction to flow.

In vessel 104, some of the internals promote intimate mixing and extended contact time, and others facilitate vapor/liquid separation. As described in more detail in conjunction with FIG. 2, the gaseous stream flows upwardly through the charge of the treatment composition in vessel 104 (after being directed to the bottom of the vessel), and treated gas exits vessel 104 at outlet 108.

In some alternative embodiments, the treatment system includes vessel 104 and a requisite charge of treatment composition, but not treatment coil 102. In some of these embodiments, injectors (not depicted) are used to intermittently inject treatment composition to supplement the initial charge thereof. When the level of the monitored impurities rises above threshold levels, additional treatment composition is injected into vessel 104. This can be performed automatically using a control system with appropriate set points, or done manually.

In some further embodiments, the treatment system includes two (or more) versions of the vessel, arranged in series or in parallel. In some embodiments in which two or more vessels are used, they may differ in size. The use of different-sized vessels is typical in embodiments in which the vessels are arranged in series.

In yet some further embodiments, the treatment system includes treatment coil 102 and continuously injected treatment composition, but not vessel 104. In embodiments in which the treatment coil is used without vessel 104, a small vapor-liquid separator (knock-out drum) may be used downstream of the treatment coil to remove any entrained liquid from the gas stream. In some further embodiments, the treatment system includes two (or more) versions of the treatment coil, arranged in series or in parallel. In some embodiments in which two or more treatment coils are used, they differ in size (usually length). The use of different-sized treatment coils 102 is typical in embodiments in which the treatment coils are arranged in series.

The treatment coil is arranged as a serpentine arrangement of piping for space considerations, not for reasons pertaining to the efficacy of the treatment system/process. The piping may, in fact, be arranged in any convenient fashion, including in a vertical orientation (such as for spacing saving reasons). For example, if desired, the treatment coil might in fact be a linear arrangement of piping, etc. Thus, in the context of treatment coil 102, the word "coil" is not to be taken literally.

In some further embodiments in which the treatment system includes both types of equipment (i.e., vessel 104 and treatment coil 102), more than one version of the treatment coil and/or more than one version of the vessel may be included. To the extent that multiple versions one or both types of equipment are present, such versions can be same size or a different size.

Vessel.

FIG. 2 depicts a cross-sectional view of vessel 104. In the illustrative embodiment, vessel 104 has a generally cylindrical wall 209 and an upper cap 211 having a semi-spherical form. Cap 211 is welded to wall 209. In the illustrative embodiment, vessel 104 has a flat bottom that is welded to wall 209. However, in some other embodiments, a lower cap (not depicted) similar to upper cap 211 is welded to the bottom of wall 209. In either case, wall 209, upper cap 211, and the flat bottom or lower cap form a closed vessel; that is, vessel 104. Wall 209 includes manholes (not depicted), for access to the interior of vessel 104, and may include one or more sight-glasses for visual inspection. Vessel 104 may additionally include other conventional features, such as a pressure relief valve, etc.

Vessel 104 further includes inlet 106, outlet 108, and a plurality of internals, including downcomer 210, baffles 216A, 216B, and 216C, and liquid knockout plates 218A and 218B.

Upper end 212 of downcomer 210 couples to inlet 106. Lower end (outlet) 214 of downcomer is proximate to the bottom of vessel 104, so that the incoming gaseous stream passes through substantially the full charge of treatment composition resident in vessel 104. Typically, the liquid level of the charge of treatment composition in vessel 104 is above baffle 216B and below liquid knockout plate 218A during operation, which represents about one-half to two-thirds of the volume of vessel 104.

As such, baffles 216A and 216B are disposed in the "wet" section of the vessel (submerged in the treatment composition). Baffle 216C is in the "dry" section of vessel 104.

In the illustrative embodiment, baffles 216A, 216B, and 216C are "bowed." As arranged in vessel 104, baffle 216A is concave upward, baffle 216B is concave downward, and baffle 216C is concave downward. As discussed further below, this arrangement—in particular the concave-downward orientation of baffle 216C—has quite unexpectedly yielded significant performance benefits.

Additional detail of baffles 216A, 216B, and 216C is depicted in FIG. 3A. Each of the baffles includes a feature that creates passageway 220, which is peripherally located on the baffle and enables gas to flow upwardly past the baffle when process vessel 104 is in service.

In the illustrative embodiment depicted in FIGS. 3A-3D, passageway 220 is created as follows. A portion (one-half in the illustrative embodiment) of the circumference of each baffle 216A, 216B, and 216C has a relatively larger radius R1 associated therewith, and another portion has a relatively smaller radius R2. The difference in the size of radiuses R1 and R2 is the feature that, as installed in vessel 104, creates passageway 220. More particularly, a gap is formed between the inner surface of wall 209 and the circumference of the baffle in the region having smaller radius R2. This "gap" is passageway 220, through which gas flows upwards past the baffle.

In some embodiments, the width of passageway 220 is in the range of about 1 to about 10 percent of the inside diameter of vessel 104, and more typically in the range of about 2.5 to about 5.5 percent of the inside diameter of the vessel. Since the diameter of each baffle, as measured based on the relatively larger radius, is about the same as the inside diameter of vessel 104, the difference in size between radius R2 and radius R1 will be about the same as the width of passageway 220 (i.e., in a range of about 1 to about 10 percent of the diameter of the baffle, based on the larger radius). So, for example, for a vessel having an inside diameter of 36 inches, passageway 220 will typically have a width in the range of about 1 to 2 inches. And likewise, radius R2 would typically be about 1 to about 2 inches less than radius R1.

It is desirable for passageway 220 to extend for less than 50 percent of the circumference of each of baffle 216A, 216B, and 216C. However, as the length of passageway 220 decreases (for a given passageway width), an undesirable increase in back pressure may occur in vessel 104. As such, the circumferential extent of the smaller-radius portion of the baffles is advantageously as limited as possible without increasing back pressure within vessel 104. This can be determined via simple experimentation. A suitable initial assumption for the purpose of design is that passageway 220 extends for 50% of the circumference of vessel 104 (i.e., the relatively smaller radius portion extends for 50% of the circumference of the baffle). Each of baffles 216A, 216B, and 216C include opening 324 for receiving downcomer 210.

As installed in vessel 104, baffles 216A, 216B, and 216C are, in the illustrative embodiment, rotated relative to one another so that passageway 220 for the flow of gas past a baffle is at least partially offset from the overlying and/or underlying baffle. This is illustrated in FIGS. 3B through 3D, wherein lowermost baffle 216A (FIG. 3B) is arranged so that smaller radius R2 (and resulting passageway 220) aligns with the forward half of the circumference of vessel 104 (the circumference is depicted via a dashed circle), intermediate baffle 216B (FIG. 3C) is arranged so that smaller radius R2 aligns with the rear half of the circumference of vessel 104, and uppermost baffle 216C (FIG. 3D) is arranged so that smaller radius R2 aligns with the left half of the circumference of vessel 104. It is notable that passageway 220 at uppermost baffle 216C is also depicted in FIG. 2.

This staggered arrangement of passageway 220 ensures that the gas does not tend to "channel" through vessel 104, as would be likely to occur if the three passageways of the three baffles were aligned. In some other embodiments, the arrangement of the stagger is altered (e.g., the orientations of baffles 216A through 216C is different than what is shown in FIGS. 3B-3D).

In the illustrative embodiment depicted in FIGS. 3B through 3D, the only way for gas to flow upward past baffles 216A, 216B, and 216C is through passageway 220 formed between the respective baffle and the inside surface of wall 209 of vessel 104. However, in some other embodiments, a plurality of small holes (diameter of about 0.5 to 1 inch) may be formed in baffles 216A and/or 216B as an addition to passageway 220. This provides a way, if necessary, to keep the lateral extent of the passage below a desired threshold (e.g., no more than 50 percent of the circumference of the baffle, etc.) while preventing an unacceptable increase in back pressure. It is notable that such holes are not formed in any alternative embodiments of baffle 216C, for reasons discussed below.

In some other embodiments, the feature that creates passageway 220 takes a different form. For example, in FIG. 3E, the feature that forms passageway 220 is slot 323, which is formed near the periphery of a portion of the circumference of each baffle. Slot 323 forms a passageway having the same dimensions as passageway 220 created via the difference in radii R1 and R2 as in FIG. 3A. In some further embodiments, the opening that forms passageway 220 is a series of holes (not depicted) that are arranged along a portion of the periphery of each baffle 216A, 216B, and 216C. Other features suitable for forming passageway 220 may suitably be used, as will occur to those skilled in the art in conjunction with the present disclosure.

As previously noted, knockout plate 218A is above the nominal level of liquid in vessel 104. As its name implies, the function of the knockout plate is to separate or "knock out" liquid entrained in the upwardly flowing gas within vessel 104. As depicted in FIG. 3G, knockout plate 218A (and 218B) includes a plurality of spaced-apart holes 222 through which the gas passes. In some embodiments, holes 222 have a diameter of about 1 inch, and have a spacing of about 2 to about 3 inches to neighboring holes 222. However, other layouts, including a smaller or larger hole diameter and/or greater or lesser hole spacing may suitably be used. Knockout plate 218A also includes opening 326 for receiving downcomer 210.

Baffle 216C is disposed above knockout plate 218A. The inventor observed, quite unexpectedly, that a layer of liquid (i.e., treatment composition) forms above knockout plate 218A when bowed baffle 216C is present above it. This liquid layer was not observed when baffle 216C was implemented as a "flat" plate, or oriented concave-upward, like baffle 216A. In the context of a sulfur-removal application, in which the establishment of this secondary liquid layer was first observed and which is discussed later in this specification, markedly better sulfur-removal performance was obtained.

It is believed that concave-downward orientation of baffle 216C tends to direct gas that impinges on it downward, back towards knockout plate 218A. As compared to a flat or concave-upward baffle, the concave-downward baffle makes it more difficult for gas to escape through peripheral opening 220. As a consequence, and perhaps due to an associated increase in pressure, liquid falls out of the vapor and forms a "secondary" liquid layer on knockout plate 218A. Gas rising past baffle 216B passes through this secondary liquid layer, and thus experiences increased contact time with the treatment composition. Simply increasing the liquid level in vessel 104 does not provide an equivalent performance increase. It is believed that the arrangement of concave-downward baffle 216C and underlying knockout plate 218A increases the residence time of gas in vessel 104, which contributes to the observed performance enhancement. This is expected to yield performance improvements of varying degree for many different types of impurities-removal processes. What is most important from a performance perspective is that baffle 216C is neither flat nor oriented "concave-upward."

Consequently, the combination of knockout plate 218A and overlying baffle 216C with a concave-downward orientation function, collectively, as a "standalone" internal structure or arrangement that can be used independently of vessel 104. That is, the internal structure can be incorporated into other vessel designs for other gas phase treatment applications, particularly when an increase in residence time for increased gas/treatment-composition contact is beneficial.

Referring now to FIG. 3F, due to the "bowed" nature of baffles 216A, 216B, and 216C, they have the potential to impact vessel height. In particular, each baffle has rise 217 associated therewith. A rise of about 5 to 6 inches, for a baffle diameter (~ vessel inner diameter) of about 36 inches has proven effective for impurities remediation as described further below. For other baffle diameters, rise 217 should be scaled to provide a similar curvature to the baffle, as a nominal starting point for a design. Other than the impact on vessel height, curvatures that are two or three times as great as the nominal curvature are expected to be satisfactory and might even yield a further performance benefit.

Knockout plate 218B is situated above baffle 216C, and is intended to knock out entrained liquid from the gas before it exits vessel 104.

The material of construction for vessel 104 (i.e., cylindrical wall 209, cap 211, and internals) is, to a certain extent, a function of the impurities in the gas stream being processed, and, to a lesser extent, the pressure and temperature of the gas stream. In some embodiments, the material of construction for all elements of vessel 104 is carbon steel. In some other embodiments, stainless steel, Inconel, or other various other metal alloys as are typically used in the industry may suitably be used for one or more elements of vessel 104.

The diameter of vessel 104 is based on gas throughput. In some embodiments, the velocity of the gas through vessel 104 is less than 3 meters (10 feet) per second, and more preferably less than or equal to 1.5 meters (5 feet) per second.

After a period of operation, the charge of the treatment composition in vessel 104 must be partially or completely purged and replenished. This is due to the fact that sulfur, $CO_2$, and other contaminants are sequestered in the treatment composition, and its effectiveness declines as a consequence. To this end, the contaminants levels in the treated gas exiting vessel 104 are monitored.

When a contaminant in the treated gas exceeds a desired level, it may be possible to alter processing conditions, such as increasing the injection rate of treatment composition to treatment coil 102, decreasing the flow of gas to treatment system 100, etc. However, in the absence of such an ability, or having altered the operation to the extent possible, the charge of the treatment composition in vessel 104 must be partially or completely replaced.

In some embodiments, this will require a temporary shutdown of treatment system 100 to drain the spent treatment composition and add a fresh charge of the treatment composition to vessel 104. In some other embodiments, treatment system 100 will include two or more vessels 104, such that one may be taken offline to replace its charge of treatment composition while the other vessel remains operational. In such scenarios, and when the vessels are arranged in series, a reduction in gas throughput may be required to meet specification for the treated gas. In yet some further embodiments, vessel 104 is appropriately piped (not depicted) to enable spent treatment composition to be withdrawn therefrom and fresh treatment composition to be added as system 100 continues to operate. Typically, the spent treatment composition is withdrawn from a tap located relatively nearer to the bottom of vessel 104, and the fresh charge of treatment composition is added at a location that is above the nominal liquid level in the vessel.

Treatment Coil.

Figure 4:
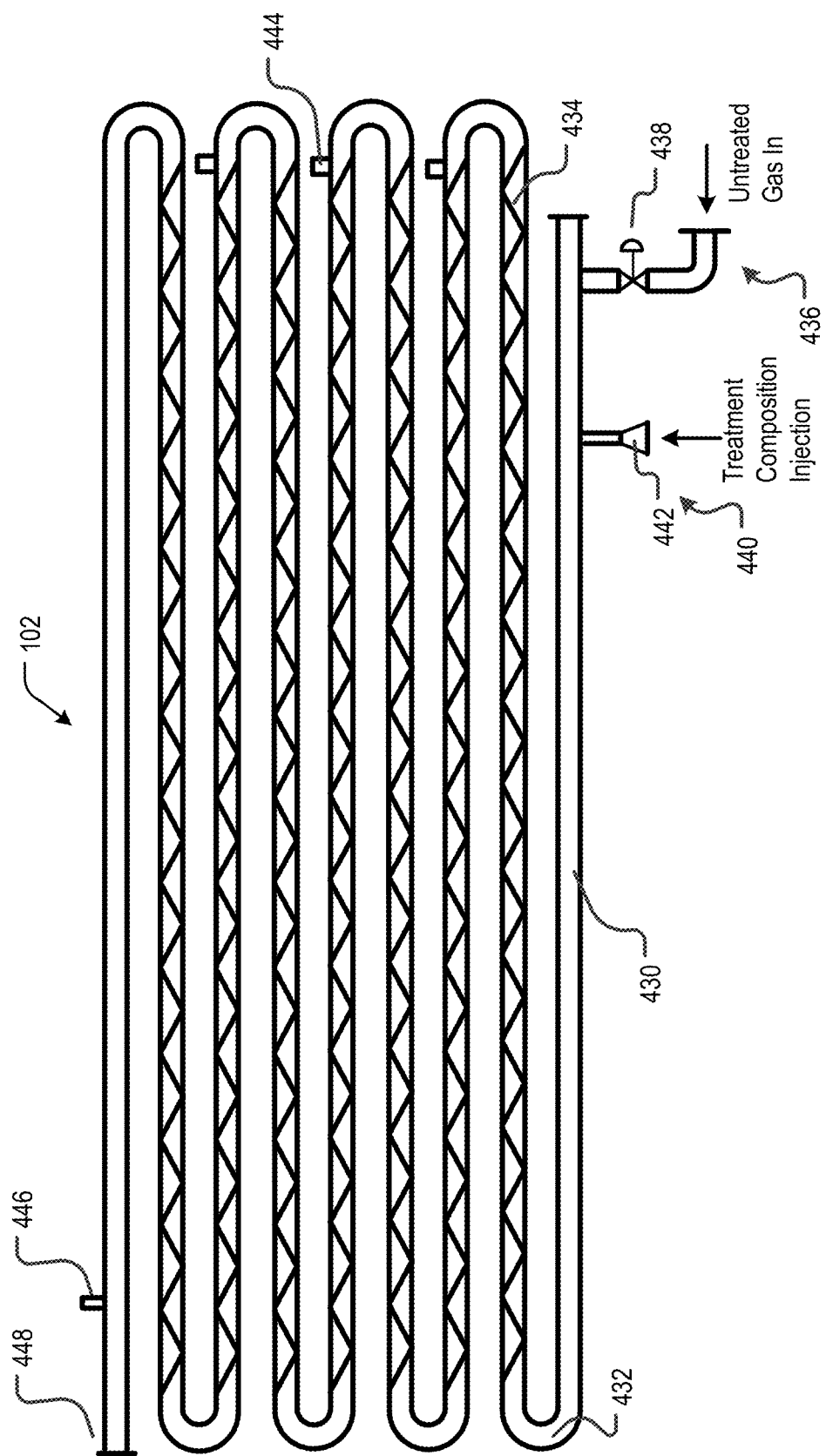
FIG. 4 depicts a treatment coil of the treatment system of FIG. 1

FIG. 4 depicts treatment coil 102 in accordance with an illustrative embodiment of the invention. As previously noted, treatment coil 102 can be used in conjunction with vessel 104 or on its own, depending on the application and impurity levels in the gas stream being processed. When used without vessel 104, a small vapor-liquid separator, which is located downstream of treatment coil 102, might be required to separate any entrained liquid from the treated gas.

In the illustrative embodiment, treatment coil 102 comprises a serpentine arrangement of piping, horizontally oriented and organized as a plurality of straight segments of pipe 430 coupled by u-bends 432. The treatment coil includes untreated gas inlet 436 at a first end thereof where untreated gas is introduced into the coil, such as through valve 438. Treatment composition is injected proximate to and downstream of gas inlet 436 at injection point 440. In some embodiments (not depicted), the treatment composition is injected at multiple locations along treatment coil 102. In some embodiments, the treatment composition is atomized when injected, such as via atomizer 442. Treatment coil 102 terminates at flange 448, at which it may be coupled to vessel 104, a vapor-liquid separator (not depicted), another instance of the treatment coil, or other item of process equipment.

In some embodiments, straight pipe segments 430, with the exception of the initial and final straight segments, each contain internal 434, discussed further below. Treatment coil 102 also includes cleanout ports 444, and one or more test ports 446.

In the illustrative embodiment, internal 434 is metal strap that is twisted into a helical form. Internal 434 extends across the full inner diameter of pipe segments 430. In the illustrative embodiment, internal 434 within each pipe segment is discrete; that is, it is not coupled to the internals in other pipe segments.

As depicted in FIGS. 5A and 5B, internal 434 may be formed by attaching one end of a straight segment of strap 554 to device 550, which rotates/twists the strap into a helical form. The strap must of course be bound (not depicted) at its opposite end to be twisted into a helical form. Once formed, internal 434 is inserted into straight pipe segment 430. It will be appreciated that in its initial form, strap 554 must be wider and longer than pipe segment 430, since the process of twisting strap 554 will reduce its length and overall width (i.e., the "diameter" of internal 434 will be less than the width of untwisted strap 554). For example, to create internal 434 for a straight pipe segment having a length of 24 feet and an internal diameter of 2 inches, a strap having a width of 3 inches and a length of 30 feet may be used.

The helical form of internal 434 promotes intimate contact between the gas being treated and the atomized treatment composition. Moreover, the helical form provides minimal impediment to the flow of gas through treatment coil 102. In this regard, other internal designs were tested, such as various baffling arrangements, as well as packing, such as desiccant beads. These other approaches impeded flow and were not as effective in causing intimate mixing between the gas and treatment composition, as determined by the level of impurities removed.

In some other embodiments, internal 434 is a preformed metal or composite structure having a helical form. In yet a further embodiment, the internal 434 is embodied as a plurality of vanes (not depicted) extending inward from the inside surface of straight pipe segments 430. The vanes define a helical form as they extend along the length of the straight pipe segment.

It is notable that treatment coil 102 is provided with a serpentine shape for space considerations; this shape has little or no impact on the effectiveness of the process. In some other embodiments, treatment coil 102 is not in a serpentine form, but rather has a different form. For example, the treatment coil can even be a linear arrangement of piping. Moreover, treatment coil 102 need not have a horizontal orientation; it may be oriented vertically or at any angle between horizontal and vertical, as desirable or required due to space considerations, etc.

The length and diameter of treatment coil 102 are a function of the amount of gas being treated, the concentration of impurities in the gas being treated, and to some extent, the composition of the gas being treated. Issues such as residence time in the treatment coil and the velocity through the treatment coil are application specific, and best determined by routine experimentation. As a guideline for residence time and velocity through treatment coil 102, a treatment coil having 13 runs of straight pipe, each 24 feet in length and having a 2-inch diameter may be used to treat a gas flow of 300,000 SCFD of gas. It is notable that the velocity of the gas through treatment coil 102 is substantially higher than the velocity of the gas through vessel 104.

The aforementioned guideline is expected to be generally applicable, but as the levels of impurities (e.g., hydrogen sulfide, carbon dioxide, etc.) rise above a few percent in the untreated gas stream, removal to undetectable levels at the outlet of the treatment coil may become problematic. In embodiments in which the treatment coil is followed by vessel 104, or a second treatment coil, this might be of no concern. However, in a treatment system that relies on a single item of equipment—treatment coil 102—for impurities remediation, this must be addressed. Of course, the injection rate of the treatment composition can typically be increased to address higher concentrations of impurities. But doing so without consideration of the contact time between the untreated gas and the treatment composition may result in what is effectively an excessive use of the treatment composition. That is, by increasing contact time in treatment coil 102, such as by increasing the length of treatment coil (to increase residence time therein), a relatively lower injection rate of the treatment composition may be possible than would otherwise be the case. Of course, another possibility for increasing contact time is to increase the diameter of the treatment coil (thereby decreasing velocity), but that would require a new and redesigned treatment coil, as opposed to simply extending the length of an existing treatment coil.

The material of construction for treatment coil 102 (including its internals) is a function of the impurities in the gas stream being processed, and, to a lesser extent, the pressure and temperature of the gas stream, as described with respect to vessel 104. In embodiments in which the treatment system includes both treatment coil 102 and vessel 104, both pieces of equipment will typically be formed of the same material. Typically, the material of construction for all elements of treatment coil 102 is carbon steel. In some other embodiments, stainless steel, Inconel, or other various other metal alloys as are typically used in the industry may suitably be used for treatment coil 102 and/or its internal 434. And as previously mentioned, in appropriate scenarios, internal 434 may be a composite material.

Treatment coil 102, vessel 104, and the combination thereof are expected to be suitable for use in any treatment application wherein treatment simply requires contact of the treatment composition with impurities it is useful for treating.

Treatment Composition.

The treatment composition is suitable for remediating a number of contaminants typically present in natural gas streams, including $H_2S$, mercaptans, thiophene, disulfides, and $CO_2$, among others.

In some embodiments, the treatment composition has a pH of at least 12.0 and comprises:
an aqueous hydroxide solution that constitutes at least 80 weight percent of the treatment composition;
at least one hydroxide compound at a collective concentration of 35-55 weight percent of the aqueous hydroxide solution;

at least one organic acid constituting 0.1 to 5 weight percent of treatment composition, wherein the organic acid is selected from the group consisting of fulvic acid and humic acid;

a chelating agent constituting 0.1 to 5 weight percent of the treatment composition.

In some other embodiments, the treatment composition also includes at least one of a surfactant and a buffering agent.

With respect to the hydroxide compound(s) used in the treatment composition, it is preferable to use only hydroxide compound(s) that do not contain element(s)/components that are also present as a significant contaminant in the gas being treated. For example, if a substantial amount of sodium chloride is present in the gas being treated, then the selected hydroxide compound(s) in the treatment composition should be compounds other than sodium hydroxide (NaOH). In that case, suitable hydroxides would include, for example: potassium hydroxide (KOH), lithium hydroxide (LiOH), magnesium hydroxide ($Mg(OH)_2$), and/or manganese hydroxide ($Mn(OH)_2$, $Mn(OH)_4$).

In the specified range, the organic acids (fulvic acid, humic acid) prevent precipitates from forming in the treated gas. The chelating agent, some examples of which include ethylenediaminetetraacetic acid or EDTA ($C_{10}H_{16}N_2O_8$), improves the molar reactivity of the hydroxide compound(s) and helps to prevent formation of precipitates, among any other functionality.

In some embodiments, the treatment composition is modified by mixing it with a hydrocarbon-based liquid, which may be refined or not refined, and may have an API rating in a range of about 30-50. Examples of refined hydrocarbon-based liquids suitable for use include: #1 diesel fuel, #2 diesel fuel, or off-road diesel fuel. In some embodiments, the aqueous-based treatment composition and the hydrocarbon-based liquid are combined in substantially equal volumetric amounts. In some other embodiments, the modified treatment composition includes more or less of either the aqueous-based composition or the hydrocarbon-based liquid (e.g., 60:40 or 40:60 on volume basis). Specific gravity of the aqueous composition may be around 1.4 and specific gravity of the hydrocarbon-based liquid may be around 0.98; the specific gravity of the blended mixture will be somewhere in between these values.

The treatment composition and modified treatment composition discussed above, and additional embodiments of a treatment composition for remediation of contaminants in a gas stream are described in U.S. Pat. Nos. 10,913,911 and 11,549,064, previously referenced. The various compositions for treating gas streams described therein are suitable for use in conjunction with the treatment systems described herein. However, when using some treatment compositions discussed in the aforementioned patents, the treatment systems described herein may require appropriate modification (i.e., additional equipment). Such a determination, and the implementation of modifications, is within the capabilities of those skilled in the art, in conjunction with the present disclosure and the referenced patents.

Test Results for Remediating Sulfur and Carbon Dioxide from a Gas-Phase Stream.

Example 1. A natural gas stream containing about 66.6% C1 to C3 hydrocarbons, 10.7% C4 to C6+ hydrocarbons, 15.7% Nitrogen, 6.6% carbon dioxide, and 0.2% hydrogen sulfide (all in mol percentages) was treated to reduce both the hydrogen sulfide and the carbon dioxide in accordance with the present teachings. Testing was performed on: (i) treatment coil 102 alone and (ii) vessel 104 alone. The gas flow rate was 300,000 SCFD. Treatment composition (see below) was supplied to treatment coil 102 at a rate of 3 gal/hr. Vessel 104, having a 36-inch inside diameter, and as described above, was filled two-thirds with treatment composition. Treatment coil 102 included 13 runs of 2-inch diameter straight pipe, each 24 feet in length. The treatment was conducted at 150 psi. Testing for each of treatment coil 102 and vessel 104 separately showed no detectable hydrogen sulfide or carbon dioxide in the treated gas stream exiting either piece of equipment.

The treatment composition contained 40-60 weight percent of methanol, 15-30 weight percent of potassium hydroxide, and 20-30 weight percent of a propriety blend of chemicals (including organic acid and chelating agent). The treatment composition is sold under the brand name VAP-X 3 PHASE™, manufactured by 3E, Inc. of Warren, Michigan and commercially available from Apollo Petroleum Services of Picayune, MS.

It is notable that other trace sulfur removal processes, even when using VAP-X 3 PHASE™, typically operate at significantly higher pressures than the 150-psi operating pressure noted above. It is expected that treatment coil 102 and/or vessel 104 can be operated at 50 psig or even lower with acceptable performance (<5 ppm) for removing hydrogen sulfide and carbon dioxide.

Example 2. A natural gas stream containing an amount of hydrogen sulfide ranging between about 4 to 10 percent and carbon dioxide of about 0.5 percent (all in mol percentages) was treated to reduce both the hydrogen sulfide and the carbon dioxide in accordance with the present teachings. Testing was performed on (a) treatment coil 102 in series with vessel 104, and (b) vessel 104 alone. The gas flow rate was 200,000 SCFD. Treatment composition, treatment coil 102, and vessel 104 were as described for Example 1.

With both treatment coil 102 and vessel 104 operating in series, the hydrogen sulfide exiting treatment coil 102 was about 1 percent, and down to less than 5 ppm (typically 0 ppm) out of vessel 104. The carbon dioxide level exiting treatment coil 102 was 0 ppm. With only vessel 104 operating, the hydrogen sulfide and carbon dioxide levels were 0 ppm exiting the vessel.

Hydrogen sulfide was present in the gas exiting treatment coil 102 in Example 2, whereas no hydrogen sulfide was observed exiting the treatment coil in Example 1. This is due to the substantially higher levels of hydrogen sulfide in Example 2, as a function of the design of treatment coil 102 and the injection rate of the treatment composition. If desired, this situation can be addressed as previously discussed (e.g., increasing the injection rate of the treatment chemical, increasing the length of the treatment coil, etc.).

It is to be understood that the disclosure describes a few embodiments and that many variations of the invention can easily be devised by those skilled in the art after reading this disclosure and that the scope of the present invention is to be determined by the following claims.

What is claimed:

1. A system comprising a treatment coil, the treatment coil including a serpentine arrangement of pipe, wherein the serpentine arrangement comprises:
   a number, n, of straight segments of pipe,
   a number, n−1, of u-bends, wherein the n−1 u-bends couple the n straight segments of pipe together to create the serpentine arrangement, and
   a unitary internal structure having a helical form, wherein a direction of curvature of the helical form is constant, and wherein the internal structure is disposed in one of the straight segments of pipe, and has a length that is substantially equal to a length of the one straight segment of pipe.

2. The treatment coil of claim 1 wherein the serpentine arrangement of pipe has an inlet end defined by a first straight segment of pipe of the n straight segments thereof, and has an outlet end defined by a second straight segment of pipe of the n straight segments thereof.

3. The treatment coil of claim 2 wherein the first straight segment of pipe includes a flow-controlled inlet, wherein, in operation, the flow-controlled inlet receives a gas.

4. The treatment coil of claim 2 wherein the first straight segment of pipe includes a chemical injection port through which treatment composition is injected.

5. The treatment coil of claim 4 wherein the chemical injection port includes an atomizer, wherein the atomizer atomizes the treatment composition during injection.

6. The treatment coil of claim 3 wherein the serpentine arrangement of pipe includes at least one test port through which a sample of the gas is obtained.

7. The treatment coil of claim 6 wherein the at least one test port is sited in the second straight segment of pipe.

8. The treatment coil of claim 1 comprising plural instances of the internal structure, each disposed in a respective straight segment of pipe.

9. The treatment coil of claim 1 wherein n is greater than or equal to 3, and wherein the number of instances of the internal structure is n−2.

10. The treatment coil of claim 2 wherein instances of the internal structures are not present in the first and the second straight pipe segments.

11. The treatment coil of claim 1 wherein the internal structure comprises metal.

12. The treatment coil of claim 1 wherein the internal structure comprises a composite material.

13. The treatment coil of claim 1 wherein each instance of the internal structure is an arrangement of vanes disposed on an inside surface of a corresponding straight segment of the pipe.

14. The treatment coil of claim 1 wherein a length and a diameter of the treatment coil is designed to provide a desired residence time for a gas that is injected therein for treatment.

15. The system of claim 2 comprising a vapor-liquid separator, wherein the vapor-liquid separator is fluidically coupled to the outlet end of the serpentine arrangement of pipe.

16. The system of claim 1 comprising a plurality of chemical injection ports through which treatment composition is injected into the serpentine arrangement of pipe.

17. A system comprising a first treatment coil, the first treatment coil comprising a serpentine arrangement of pipe having a first length, wherein the serpentine arrangement of pipe comprises a first plurality of straight segments of pipe and a second plurality of u-bends, wherein the u-bends couple the straight segments of pipe together to create the serpentine arrangement; and
a plurality of internal structures, wherein respective ones of the internal structure are disposed in respective ones of the straight segments of pipe, and wherein each internal structure has a length that is substantially equal to a length of the respective straight segment of pipe, and wherein each of the internal structures has a helical form having a direction of curvature that is the same for all of the internal structures.

18. The system of claim 17 comprising a second treatment coil, the second treatment coil comprising a serpentine arrangement of pipe having a second length, wherein the serpentine arrangement of pipe comprises a first plurality of straight segments of pipe and a second plurality of u-bends, wherein the u-bends couple the straight segments of pipe together to create the serpentine arrangement; and
a plurality of the internal structures, wherein respective ones of the internal structures are disposed in respective ones of the straight segments of pipe of the second treatment coil, and wherein an inlet end of the second treatment coil is coupled to an outlet end of the first treatment coil.

19. The system of claim 18 wherein the second length is shorter than the first length.

20. A system comprising a treatment coil, the first treatment coil comprising a plurality of pipes that are fluidically coupled together, the pipes being arranged in either a linear form or a non-linear form; and
a plurality of identically configured internal structures disposed in at least some of the pipes of the plurality thereof, wherein each of the internal structures has a helical form with a single and unchanging direction of curvature.

* * * * *